Patented Sept. 21, 1926.

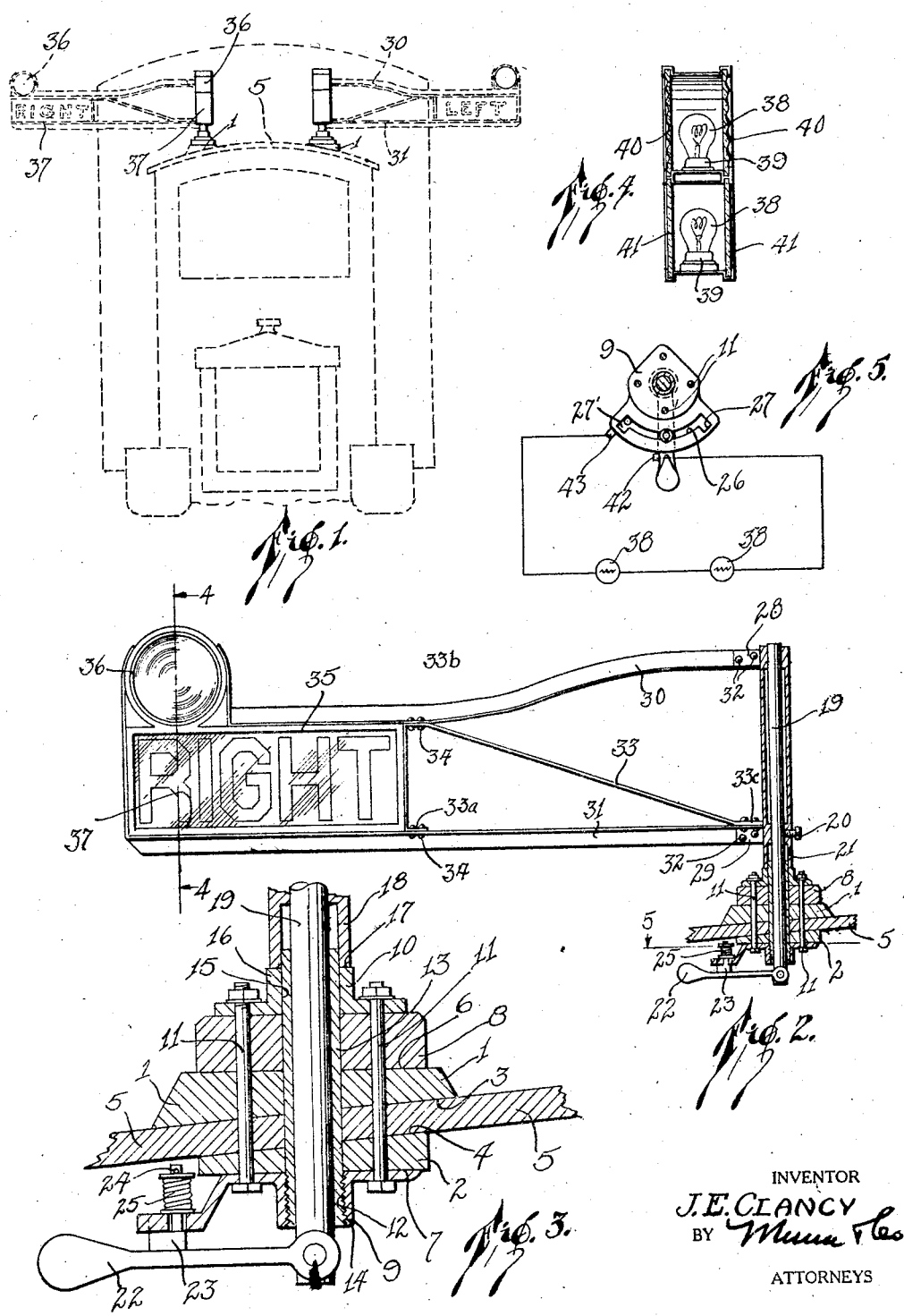

1,600,273

UNITED STATES PATENT OFFICE.

JAMES E. CLANCY, OF CHICAGO, ILLINOIS, ASSIGNOR OF ONE-HALF TO EMMA HOUSE, OF CHICAGO, ILLINOIS.

SIGNAL DEVICE FOR MOTOR VEHICLES.

Application filed January 23, 1925. Serial No. 4,299.

My invention relates to improvements in signal devices for motor vehicles, and it consists in the combinations, constructions, and arrangements herein described and claimed.

An object of my invention is to provide a signal device for motor vehicles, especially the larger type of automobile, such as trucks or busses, which is adapted to be swung into operative position to indicate the direction in which the car will turn.

A further object of my invention is to provide a device of the character described which will automatically become illuminated when swung into operative position.

A further object of my invention is to provide a device of the type described having two signaling devices which can be readily secured to the cab of the truck or the top of the bus, and operate independently of each other.

A further object of my invention is to provide a device of the type described which is simple in construction, readily readable by the driver in the approaching car, and which is not likely to easily get out of order.

Other objects and advantages will appear in the following specification, and the novel features of the invention will be particularly pointed out in the appended claim.

My invention is illustrated in the accompanying drawings, forming part of this application in which—

Figure 1 is a front view of a portion of a truck showing my invention attached thereto, one of the signals being swung into operative position, Figure 2 is a side view of one of the signals, portions thereof being broken away, Figure 3 is an enlarged sectional view of the device, Figure 4 is a section along the line 4—4 of Figure 3, and Figure 5 is a section along the line 5—5 of Figure 2.

In carrying out my invention I provide signals A and B which are identical to each other with the exception that one has the word Right thereon and the other has the word Left. Therefore one description will suffice for both.

In signal A, I provide blocks 1 and 2, having surfaces 3 and 4 respectively which are shaped to conform to a truck top 5. The blocks have outer surfaces 6 and 7 respectively. I further provide a block 8 and bearings 9 and 10 which, together with blocks 1 and 2, are secured together and to the top 5 by means of bolts 11.

The bearing 9 has a threaded opening 12. A sleeve 13 which has a threaded end 14, is screwed into the opening 12. The opposite end is passed through an opening 15 in an upturned portion 16 of the bearing 10.

The device thus far described provides a rigid support for the operating means now to be described. The portion 16 provides a bearing surface 17 for a tubular member 18. The tubular member 18 is mounted upon a shaft 19 and is rigidly secured thereto by a set screw 20. The member 20 has an opening 21 therein for the purpose of oiling. The shaft 19 is loosely mounted in the sleeve 13.

The means for oscillating the shaft 19 comprises a hand lever 22 which is pivotally mounted to the shaft. A rectangular block 23 is integral to the lever 22, and carries a pin 24 upon which a compression spring 25 is mounted. The pin 24 extends through a slot 26 in the flange 9. The slot 26 is in the form of an arc of approximately 90° and lies in a plane which extends at right angles to the axis of the shaft 19. At the ends of the slot 26 are recesses 27 and 27' which are large enough to receive the block 23.

The signal is rigidly secured to the tubular member 18. It will be seen from the drawings that the signal frame is mounted on projections 28 and 29. Angle irons 30 and 31 of the frame are secured by means of rivets 32 to the projections 28 and 29. An angular brace 33 is secured to the angle irons 30 and 31 at points 33ª, 33ᵇ, and 33ᶜ, by means of rivets 34.

The angle irons 30 and 31 have a signal housing 35 secured at their outer ends. The housing 35 has compartments 36 and 37 in which electric light bulbs 38 and sockets 39 are placed. A glass 40 of any desired color is removably held in the housing 36, at each end thereof (see Figure 5). Two rectangular glass plates 41 are removably held in the housing 37. The plates 41 have the word Right thereon which is visible in the day time, and which is illuminated at night by the lights.

From the foregoing description of the various parts of the device, the operation thereof may be readily understood. The device may be easily applied to any truck or bus in various ways. One way in which it can be applied is by first boring a hole through the top just large enough to insert the sleeve 13, after which the block and bearings are clamped together by means of the bolts 11. Both signals A and B are secured to the vehicle in the manner described. The signal A is disposed on the right side of the truck, and the signal B is disposed on the left side of the truck.

The position of the signals A and B in normal position is as shown in solid lines in Figure 1. In operation, the driver can warn other drivers behind him or in front of him as to which direction he wishes to turn. For example, if the driver wishes to turn to the right, he merely pulls down upon the hand lever 22 of the signal A and moves the lever far enough to release the block 23 from the recess 27. He then swings the lever through an arc of 90° until the block 23 is received in the recess 27. By so doing, the signals are swung out beyond the edge of the truck so that they may be viewed both from the front and rear. When swung into this position, the lights are automatically energized by closing the circuit. The circuit is closed when the contact point 42 which is carried by the handle 22, is swung into engagement with the contact point 43. When the lights are swung into normal position again the electric current is automatically cut off. If the driver wishes to turn to the left he merely pulls down upon the hand lever 22 of the signal B and swings it around in a similar manner except in an opposite direction to that of the signal A. The lights in the signal B are automatically turned on and off in the same manner as those of the signal A.

If the driver wishes to turn to the left he swings the signal B into operative position, just before reaching the turn. In this manner he gives the other drivers due warning. After he has turned the corner he swings the signal back into normal position.

In Figure 5 it will be noted that one of the lights 38 is disposed in the compartment 36 while the other light is disposed in the compartment 37. I have found that if only the light in the compartment 37 is used, it does not attract sufficient attention. It was therefore necessary to provide a light which was used solely for the purpose of warning. This light I disposed in the compartment 36. It will now be seen that the red glasses 40 are illuminated and instantly attract the attention of drivers in approaching vehicles, while the light in the compartment 37 indicates the direction in which the vehicle is going to turn.

I claim:—

A device of the type described comprising, a signal, means for operating said signal and for locking said signal in operative position, said means including a quadrant having an arcuate-shaped slot therein, said slot having recesses at predetermined points therein, an arm for swinging said signal, a projection carried by said arm, a pin carried by said projection and being slidable in said slot, and spring means carried by said pin for moving said projection into either of the recesses to lock the arm in operative position.

JAMES E. CLANCY.